United States Patent [19]
Lake

[11] Patent Number: 5,640,179
[45] Date of Patent: Jun. 17, 1997

[54] JOYSTICK CONVERTER APPARATUS

[76] Inventor: Raymond W. Lake, 610 Barbara Way, Roseville, Calif. 95678

[21] Appl. No.: 586,549

[22] Filed: Jan. 16, 1996

[51] Int. Cl.⁶ .................................................. G06F 3/033
[52] U.S. Cl. .................................... 345/161; 345/168
[58] Field of Search .................................. 345/145, 160, 345/156, 157, 161, 163, 168; 341/20, 22; 400/472, 473

[56] References Cited

U.S. PATENT DOCUMENTS

| | | |
|---|---|---|
| 3,950,634 | 4/1976 | Speiser . |
| 4,297,044 | 10/1981 | Hornberg et al. . |
| 4,575,591 | 3/1986 | Lugaresi . |
| 4,786,768 | 11/1988 | Langewis et al. . |
| 4,825,019 | 4/1989 | Fisher . |
| 4,945,357 | 7/1990 | Tal ..................................... 341/20 |
| 5,034,574 | 7/1991 | Martovitz . |
| 5,204,511 | 4/1993 | Baitz et al. . |
| 5,343,219 | 8/1994 | DuBosque, Jr. . |

*Primary Examiner*—Mark R. Powell
*Assistant Examiner*—Christopher T. Albert
*Attorney, Agent, or Firm*—John P. O'Banion

[57] ABSTRACT

A joystick converter apparatus for use with computer keyboard arrow key arrays. A control rod includes four actuators which are structured and configured to interface with the UP, DOWN, RIGHT and LEFT arrow keys in an arrow key array. Two of the actuators are detachably coupled to two of the arrow keys, while the other two branches are positioned above and spaced apart from the other two arrow keys. Tilting or rocking the control rod in a desired direction provides corresponding cursor movement or directional control in computer programs.

9 Claims, 7 Drawing Sheets

JOYSTICK CONVERTER APPARATUS

BACKGROUND OF THE INVENTION

1. Field of the Invention

This invention pertains generally to joystick controls for computers, and more particularly to a joystick attachment for computer keyboard cursor or arrow keys which employs a central control rod coupled to a plurality of leg segments which interface with selected keys on the keyboard.

2. Description of the Background Art

Computer keyboards generally include a plurality of arrow or cursor control keys which are typically arranged in an array in a portion of the keyboard. The arrow keys are used for directional control and/or cursor movement in computer games, word processing programs, computer menus, software editing, and other applications. The most common arrow key array pattern used on computer keyboards comprises a LEFT arrow key, a DOWN arrow key, and a RIGHT arrow key which are adjacent to each other in a co-linear arrangement, and an UP arrow key positioned above the Down arrow key, to provide an inverted "T"-shaped layout. This key array is typically included in the lower right portion of the computer keyboard.

Direct manipulation of arrow keys tends to provide relatively slow cursor movement and directional control when playing computer games. Thus, various adaptive accessories have been developed for actuation of the arrow keys on computer keyboards. However, many keyboards are configured such that the arrow keys are immediately adjacent to each other without any hard keyboard surface between the arrow keys, and thus devices wherein a base rests on a keyboard surface by narrow walls cannot be used. Devices which use a clip, clamp or other bracket assembly to hold a control switch over the arrow keys are difficult and inconvenient to attach to and remove from computer keyboards. Such devices requiring a bracket assembly additionally tend to be unaesthetic and detract from the computer work environment. External joystick controls, "mouse" devices and tracking balls, which are used as alternatives to arrow keys, are relatively expensive and require mapping software to convert signals from the mouse or joystick controls to the equivalent keystrokes for the computer arrow keys.

Accordingly, there is a need for a joystick converter apparatus for use with arrow key arrays which does not require a solid keyboard surface between the arrow keys, which does not require the use of a clamp or bracket assembly to mount a joystick over the arrow keys, which is quick and simple to install and remove, and which is inexpensive. The present invention satisfies these needs, as well as others, and generally overcomes the deficiencies found in the background art.

SUMMARY OF THE INVENTION

The present invention comprises a joystick converter apparatus for use with computer keyboard arrow key arrays. The apparatus provides quick and accurate cursor movement or directional control with computer programs, and can be easily installed and removed as required without use of a support bracket. In general terms, the invention comprises a vertically oriented control rod or joystick, and first, second, third and fourth actuating means associated with the control rod for depressing keys, with three of the actuating means being aligned generally co-linear relative to each other. Means are provided for coupling two of the actuating means to two of the arrow keys, while the other two actuating means are positioned over and slightly above the two other arrow keys.

By way of example and not of limitation, there are generally first, second, third, and fourth key actuating means which are structured, configured and arranged to correspond respectively to the UP, RIGHT, LEFT and DOWN arrow keys in standard arrow key arrays on computer keyboards. The coupling means preferably comprises a fastening hook and pile fabric arrangement such as VELCRO®. The coupling means is preferably included with the first and fourth actuating means of the apparatus, with the first and fourth actuating means coupled to the UP and DOWN arrow keys respectively. The second and third actuating means are preferably positioned slightly above the RIGHT and LEFT arrow keys respectively. Means for preventing scratching of the arrow key surfaces such as rubber tips may be included on the second and third actuating means to prevent scratching of the key surfaces.

In a first embodiment of the invention, the actuating means comprises a substantially flat T-shaped plate which is structured and configured to generally cover a standard T-shaped arrow key array. The T-shaped plate includes first, second and third branches which comprise the first, second and third actuating means. A junction region between the branches comprises the fourth actuating means. VELCRO®-covered portions are included on the lower surfaces of first branch and junction region of the T-shaped plate and couple to the UP and DOWN arrow keys. Downwardly disposed nibs or protuberances are provided on the lower surfaces of the second and third branches, with the protuberances positioned over the RIGHT and LEFT arrow keys respectively, and slightly spaced apart from the RIGHT and LEFT arrow keys. The control rod or joystick is coupled to the upper surface of the T-shaped plate adjacent the first branch and the junction region.

In a second or alternative embodiment of the invention, the first, second, third and fourth actuating means comprise first, second, third, and fourth downwardly disposed branches or legs which are coupled to a lower end of the control rod. The first, second and third branches extend outward and downward from the control rod, while the fourth leg extends generally straight downward from the control rod, with the control rod positioned vertically co-linear with the fourth branch. The lower tips of the first and fourth branches are coupled to the UP and DOWN arrow keys respectively, while the lower tips of the second and third branches are positioned slightly above the RIGHT and LEFT arrow keys.

The invention is utilized by affixing, attaching, or coupling the first and fourth actuating means to the UP and DOWN arrow keys respectively of the arrow key array on a computer keyboard. When the first and fourth actuating means are thus coupled to the UP and DOWN arrow keys, the second and third actuating means are positioned over and slightly above the RIGHT and LEFT arrow keys respectively. By moving or tilting the control rod forward, pressure is applied by the first actuating means on the UP arrow key, thereby actuating the UP arrow key and providing corresponding cursor movement or directional change in computer programs. When the control rod is moved or tilted to the left, the second actuating means depresses the LEFT arrow key to provide cursor movement or directional change to the left. When the control rod is moved or tilted to the right, the third actuating means actuates the RIGHT arrow key to provide cursor movement or directional change to the right. When the control rod is moved or tilted back, the fourth actuating means contacts the DOWN arrow key, and causes corresponding downward cursor movement or directional change.

An object of the invention is to provide a joystick converter apparatus which allows quick and accurate cursor movement or directional control by direct actuation of arrow keys on computer keyboards.

Another object of the invention is to provide a joystick converter apparatus which can be quickly and easily attached to and removed from the arrow key array on computer keyboards.

Another object of the invention is to provide a joystick converter apparatus which does not require a bracket or clamp assembly associated with a computer keyboard to hold a joystick control over the arrow key array.

Another object of the invention is to provide a joystick converter apparatus which is inexpensive to fabricate.

Another object of the invention is to provide a joystick converter apparatus which may be used with computer keyboards that do not have a solid keyboard surface between the arrow keys.

Further objects of the invention will be brought out in the following portions of the specification, wherein the detailed description is for the purpose of fully disclosing the invention without placing limits thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
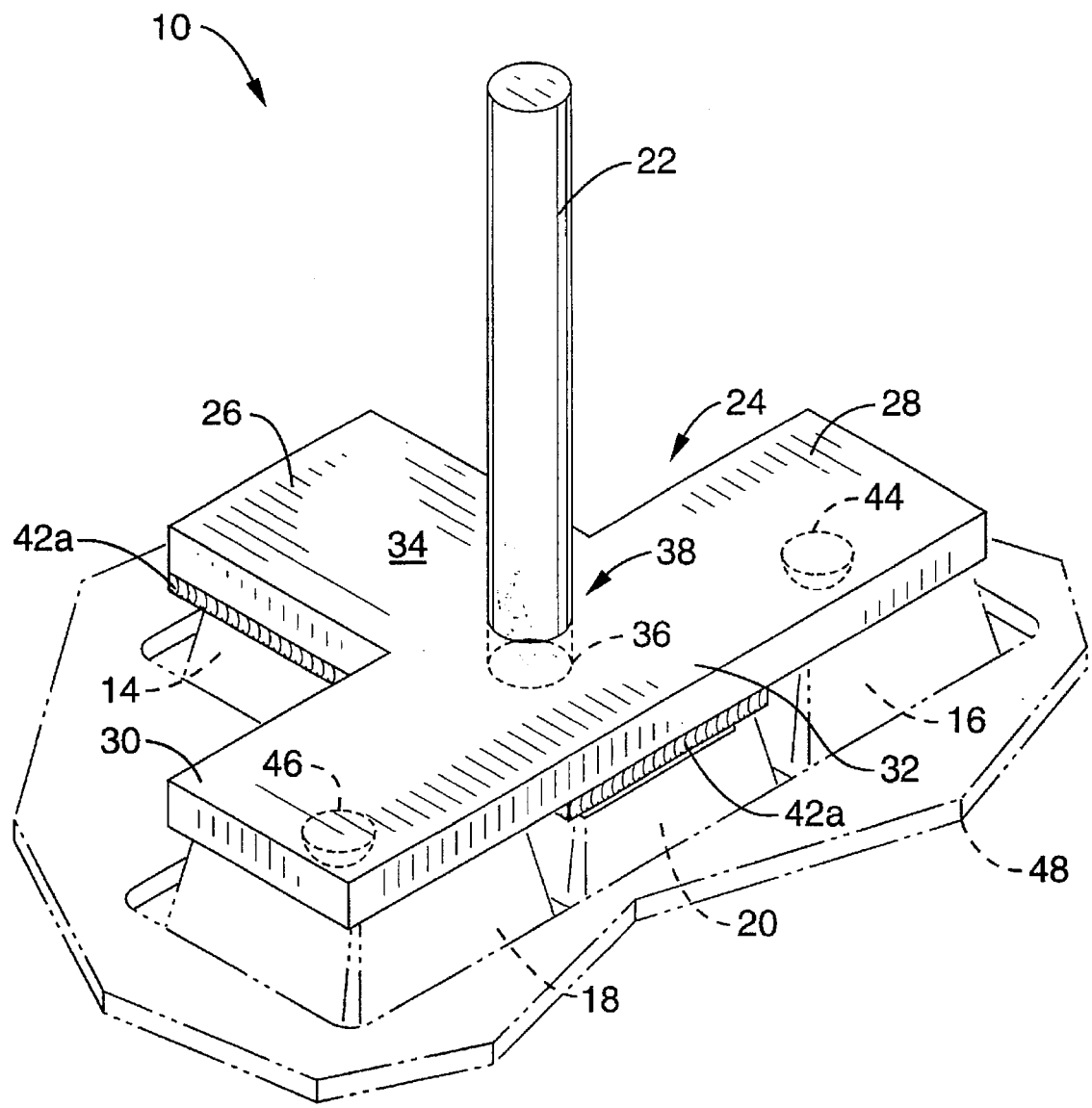
FIG. 1 is a perspective view of a joystick converter apparatus in accordance with the present invention, together with an arrow key array of a computer keyboard shown in Phantom.
Figure 2:
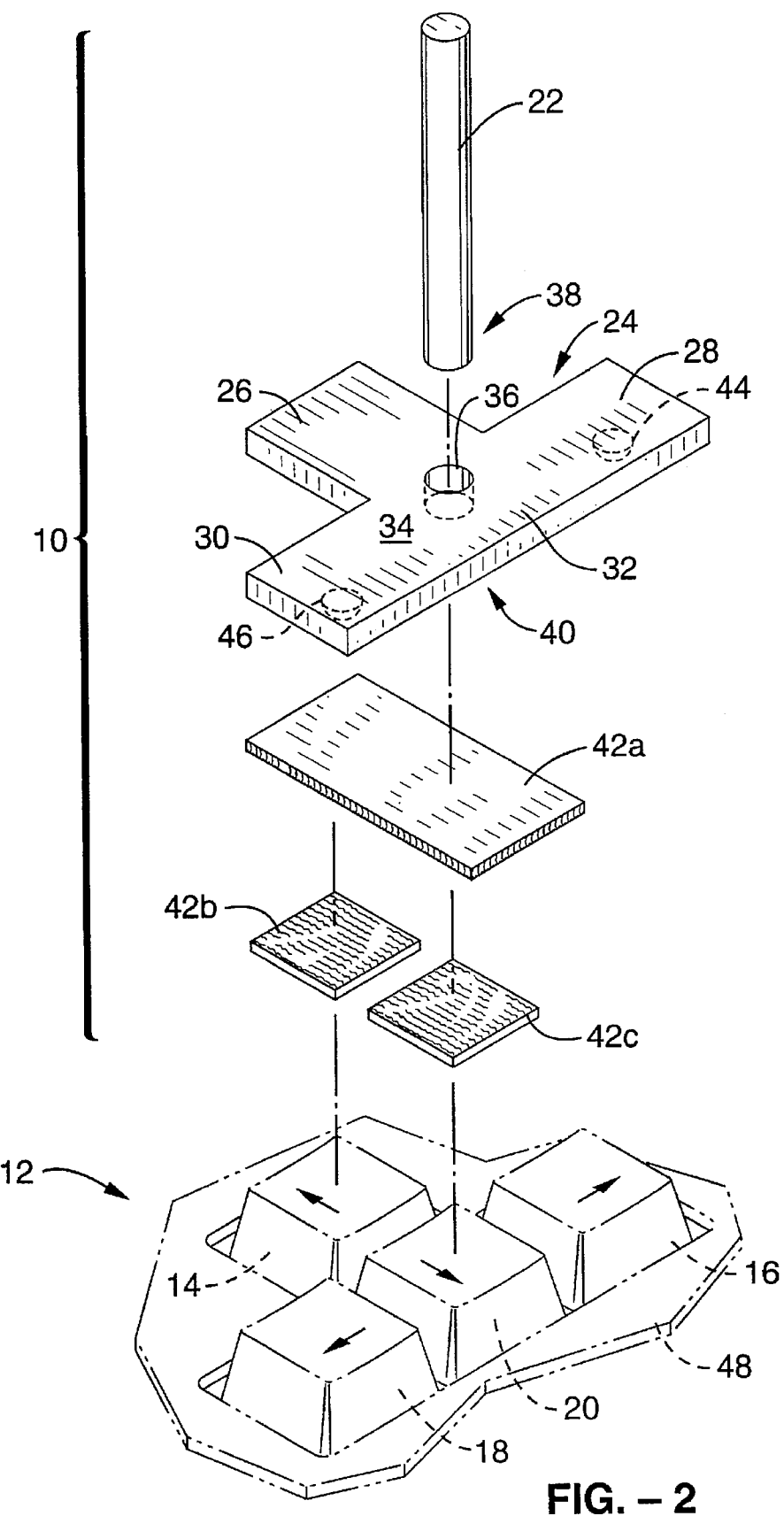
FIG. 2 is an exploded view of the joystick converter apparatus of FIG. 1.

Referring more specifically to the drawings, for illustrative purposes the present invention is embodied in the apparatus generally shown in FIG. 1 through FIG. 9. It will be appreciated that the apparatus may vary as to configuration and as to details without departing from the basic concepts as disclosed herein. While the invention is disclosed in terms of use with an arrow key array having a standard inverted T-shaped layout, it will also be appreciated that the invention may be structured and configured for use with other arrow key array layouts.

Referring first to FIG. 1 through FIG. 4, there is shown a first embodiment of a joystick converter apparatus 10 in accordance with the present invention. The apparatus 10 is generally used in conjunction with a computer keyboard arrow key array 12, seen most clearly in FIG. 2, which is shown generally as having an inverted T-shaped layout. Arrow key array 12 includes an UP arrow key 14, a RIGHT arrow key 16, a LEFT arrow key 18, and a DOWN arrow key 20, with RIGHT arrow key 16, LEFT arrow key 18 and DOWN arrow key 20 in a aligned in a co-linear arrangement or along a common axis as shown.

The joystick converter apparatus 10 includes a control rod 22, with a first, a second, a third, and a fourth key actuating means for depressing arrow keys associated with control rod 22. In the first embodiment of the invention, a substantially flat T-shaped plate 24 is provided with the joystick converter apparatus 10. Plate 24 includes a plurality of actuators or actuator branches, preferably in the form of a first branch 26, a second branch 28, a third branch 30 and a junction region 32 which is generally located between first, second and third branches 26, 28, 30. The first branch 26, second branch 28 and third branch 30 of plate 24 serve as the first, second and third key actuating means, respectively, and the junction region 32 serves as the fourth key actuating means. Generally, first branch 26 is structured and configured to correspond with UP arrow key 14, second branch 28 is structured and configured to correspond with arrow key 16, third branch 30 is structured and configured to correspond with LEFT arrow key 18, and junction region 32 is structured and configured to correspond with DOWN arrow key 20. Thus, when the invention is mounted on arrow key array 12 as described below, first branch 26 is positioned generally adjacent to UP arrow key 14, second branch 28 is positioned adjacent RIGHT arrow key 16, third branch 30 is positioned adjacent LEFT arrow key 18, and junction region 32 is positioned adjacent DOWN arrow key 20. Control rod 22 couples or connects to the top surface 34 of plate 24 by means of a bore 36 in plate 24, with a lower end 38 of control rod 22 frictionally engaging or snap fitting into bore 36. Lower end 38 of control rod may 22 may alternatively be coupled to plate 24 by adhesives or other conventional standard coupling means.

The invention includes means for detachably coupling at least one of the four actuating means to a corresponding arrow key in key array 12. Preferably, the coupling means are associated with the first and fourth actuating means, with the detachable coupling means structured and configured to reversibly attach the first and fourth actuating means to UP arrow key 14 and DOWN arrow key 20 respectively. The coupling means preferably comprises a fastening hook and pile fabric arrangement such as VELCRO® fasteners or the like. The coupling means is preferably associated with the lower surface 40 of plate 24 adjacent first branch 26 and junction region 32, and includes a fastener 42a of VEL-CRO® or like material. Corresponding fasteners 42b, 42c of VELCRO® or like material are provided on UP arrow key 14 and DOWN arrow key 20, respectively, so that fastener 42a may reversibly engage fasteners 42b, 42c, thereby coupling first branch 26 and junction region 32 to UP arrow key 14 and DOWN arrow key, respectively. Fastener 42a may alternatively comprise smaller VELCRO® pieces suitably positioned on first branch 26 and junction region 32, but a single strip fastener 42a works effectively and is generally easier to use. As is well known, VELCRO® and like fasteners use both a fastening hook portion and an opposing or mating pile fabric portion, with the hooks of the fastening hook portion engaging and intermeshing with the pile fabric of the pile fabric portion to form a coupling. Fastener 42a may comprise either the fastening hook portion or pile fabric portion of VELCRO® or like material, with fasteners 42b, 42c comprising the corresponding mating portions. Fastener 42a and portions 42b, 42b each preferably include an adhesive backing (not shown) which allows facile attachment of the fastener 42a with fasteners 42b, 42c to appropriate surfaces as related above. VELCRO® or like pile fabric and fastening hook coupling arrangements are preferred for use with the invention because fasteners 42b, 42c may be removed from UP arrow key 14 and DOWN arrow key 20, if desired, when the joystick converter apparatus 10 is not being used. However, other standard coupling means may also be used to couple first branch 26 and junction region 32 to UP arrow key 14 and DOWN arrow key 20 respectively. The detachable coupling means of the invention may alternatively be associated with the second and third actuating means.

Figure 3:
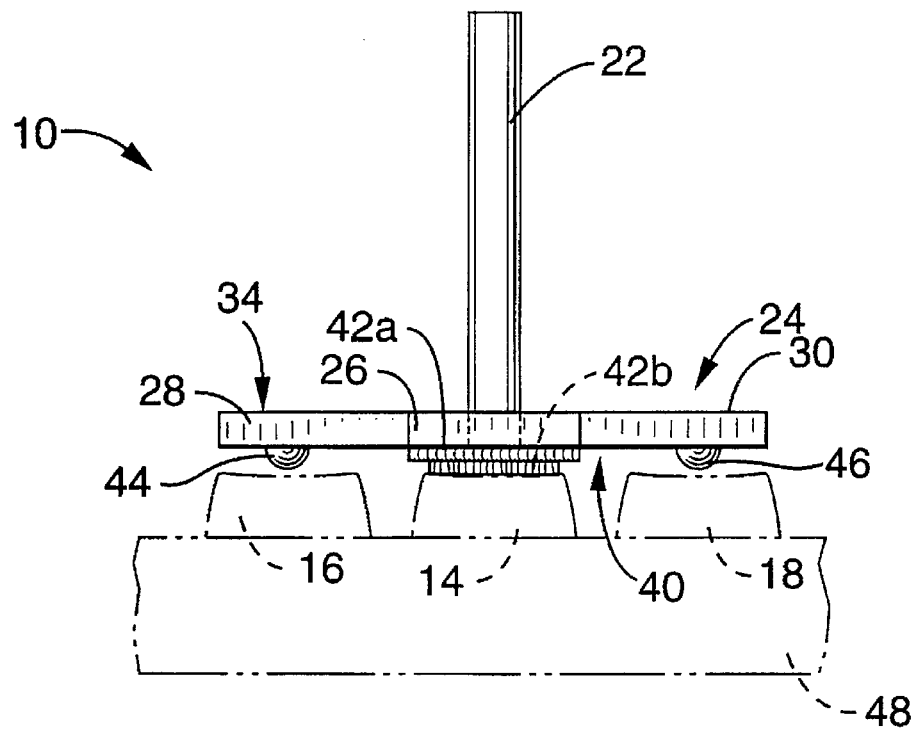
FIG. 3 is a front view of the joystick converter apparatus shown in FIG. 1.

Also included on lower surface 40 of plate 24 are a pair of nibs or protuberances 44, 46, with protuberance 44 included on second branch 28 and protuberance 46 included on third branch. Protuberance 44 is positioned on lower surface 40 of plate 24 so that protuberance 44 is centered slightly above RIGHT arrow key array 12 as mounted on arrow key array 12 as shown in FIG. 3. Protuberance 46 is likewise positioned on lower surface 40 of plate 24 so that protuberance 46 is centered slightly above LEFT arrow key 18 and spaced when plate 24 is mounted on arrow key array 12.

Plate 24 and control rod 22 are preferably fabricated from durable, inexpensive plastic or engineering resin, or composite materials thereof, although metal and metal alloy materials may also be used. Protuberances 44, 46 may be integral portions of plate 24, or may be attached to the lower surface 40 of plate. Protuberances 44, 46 may be elastomeric or resilient in nature, or may include an elastomeric coating, to prevent scratching of the surfaces of RIGHT arrow key 16 and LEFT arrow key 18 which may damage or remove the arrow decals or indicators on the key surfaces.

The apparatus 10 is employed by attaching fasteners 42b, 42c to the upper surfaces of UP arrow key 14 and DOWN arrow key, respectively, and by attaching fastener 42a to the lower surface 40 of plate with glue, adhesive backing or the like. Lower end 38 of control rod 22 is engaged in hole 36 in the top surface 34 of plate 24, and fastener 42a is engaged with mating fasteners 42b, 42c to couple first branch 26 of plate 24 to UP arrow key 14, and to couple junction region 32 to DOWN arrow key 20. When fastener 42a and fasteners 42b, 42c are engaged or mated together, protuberance 44 is centered slightly above RIGHT arrow key 16, and protuberance 46 is centered slightly above LEFT arrow key 18, as described above.

Figure 4:
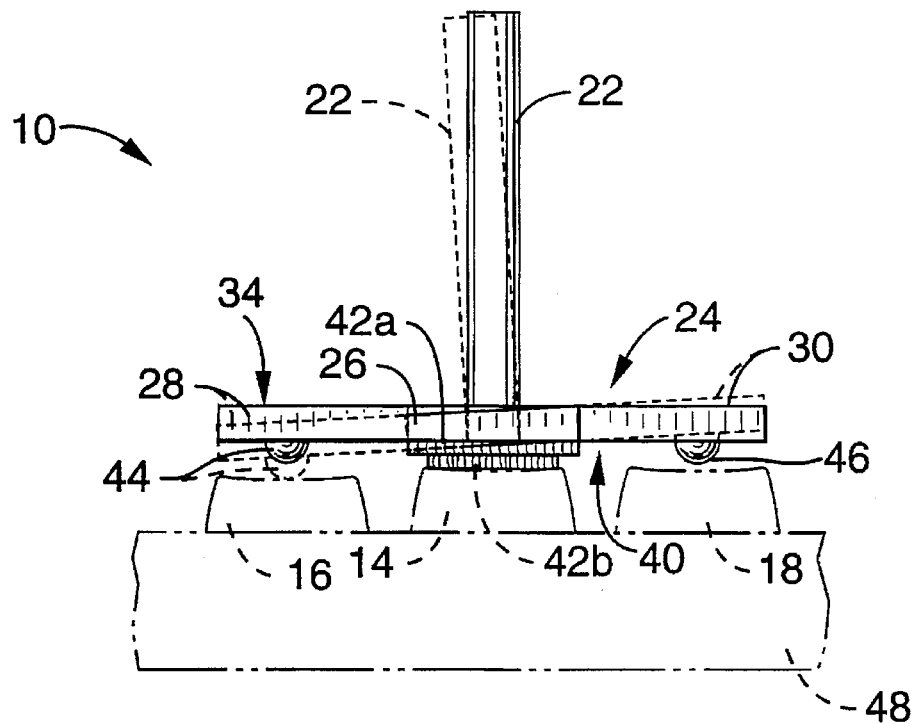
FIG. 4 is a front view of the joystick converter apparatus shown in FIG. 1, showing actuation of a RIGHT arrow key.
Figure 5:
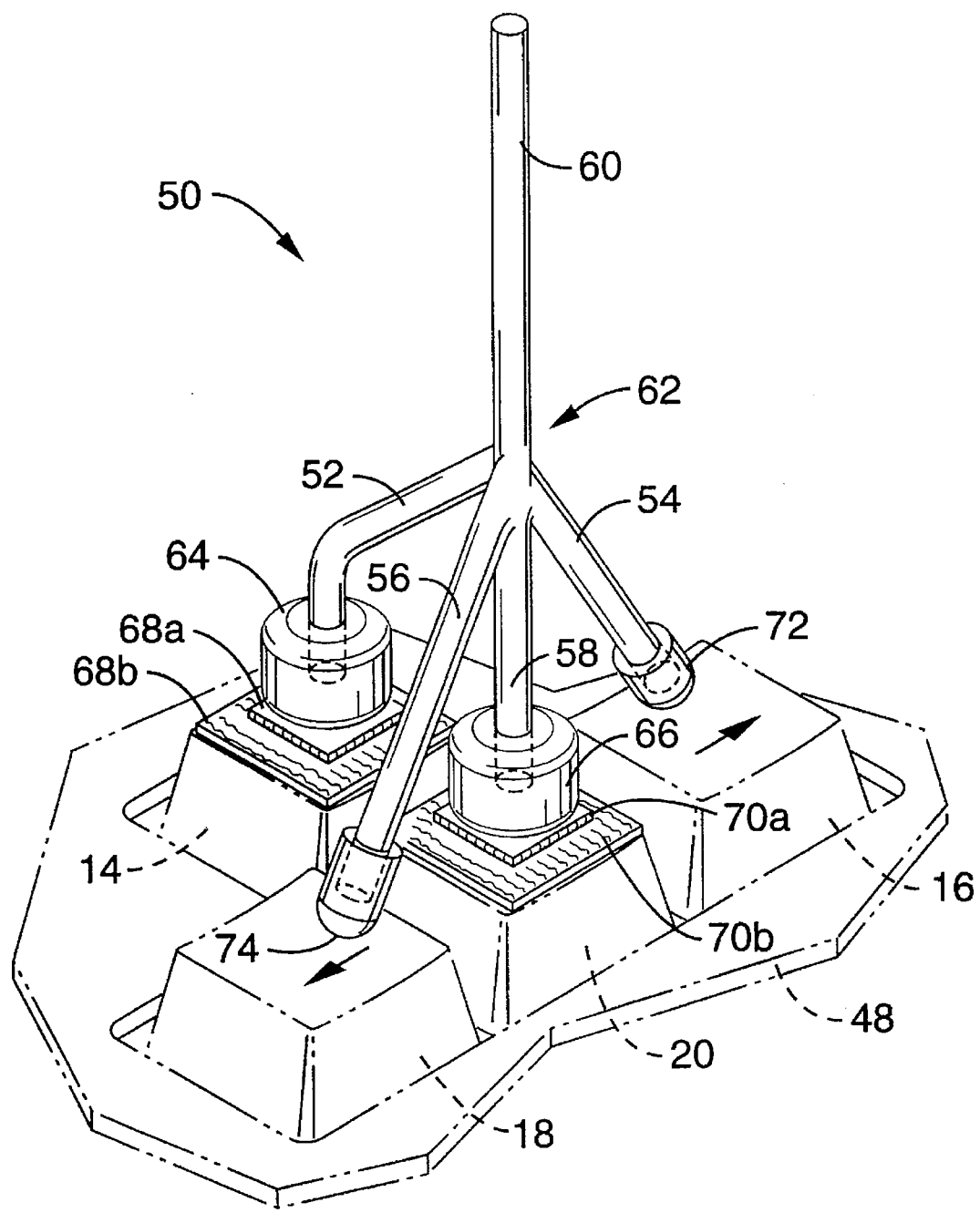
FIG. 5 is a perspective view of a second embodiment of a joystick converter apparatus in accordance with the present invention, together with an arrow key array of a compute keyboard shown in phantom.
Figure 6:
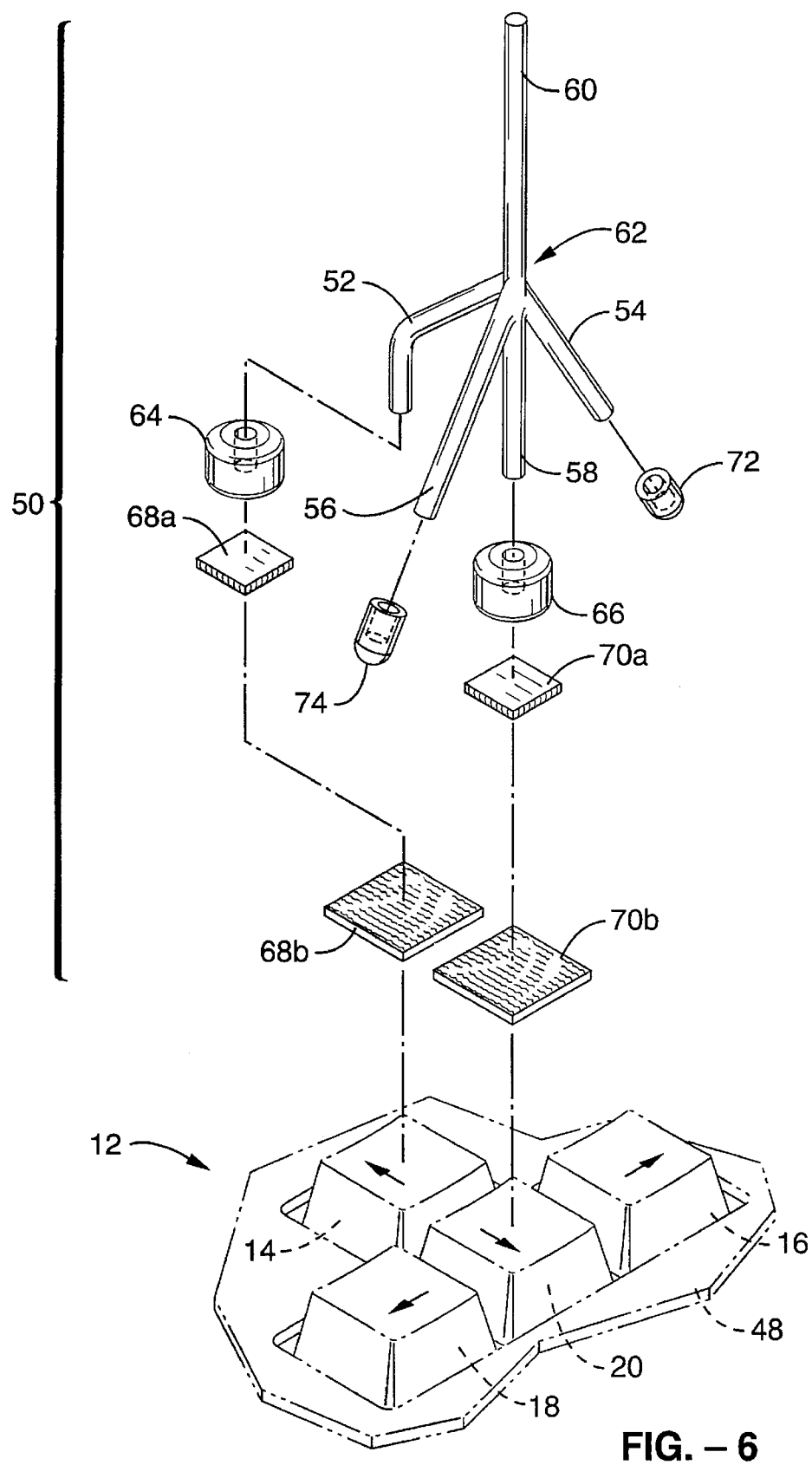
FIG. 6 is an exploded view of the joystick converter apparatus shown in FIG. 5.

When first branch 24 and junction region 32 are thus coupled to UP and DOWN arrow keys 14, 20 respectively, control rod 22 may be moved or tilted to selectively and accurately actuate chosen arrow keys. By moving or tilting control rod 22 forward, first branch 26 depresses or actuates UP arrow key 14, and providing corresponding cursor motion or directional control, or like functions for computer programs. When control rod 22 is tilted or moved to the right, protuberance 44 on second branch 28 depresses and actuates RIGHT arrow key 16, causing corresponding cursor movement or directional control. Similarly, when control rod 22 is moved or tilted to the left, protuberance 46 on left branch 30 depresses and actuates LEFT arrow key 18 for corresponding cursor movement or directional control. Actuation of LEFT arrow key 18 by protuberance 46 and third branch 30 is illustrated in FIG. 4. By tilting or moving control rod 22 back, rearward, or generally towards the user of the invention, junction region 32 on plate 24 depresses and actuates DOWN arrow key 20. Since protuberances 44, 46 are positioned above and spaced apart from RIGHT and LEFT arrow keys 16, 18, as described above, the movement or tilting of control rod 22 in a rearward direction does not result in actuation of RIGHT and LEFT arrow keys 16, 18, although protuberances 44, 46 may come into contact with RIGHT and LEFT arrow keys 16, 18 respectively and slightly depress RIGHT and LEFT arrow keys 16, 18.

The invention thus provides for quick, easy and accurate cursor movement and/or directional control in computer programs without the use of expensive peripheral devices such as an external joystick, mouse or tracking ball. No bracket assembly is necessary for attachment to computer keyboard 48 in order to correctly position the joystick converter apparatus 10 over arrow key array 12, as required with conventional devices. Further, plate 24 may be structured and configured for use with cross-shaped arrow key arrays by including a fourth branch (not shown) to serve as the fourth actuation means, and providing VELCRO® or like pieces as described above coupled to the fourth branch to the DOWN arrow key. Such an arrangement would otherwise operate in the same manner as related above for the joystick converter apparatus 10.

Figure 7:
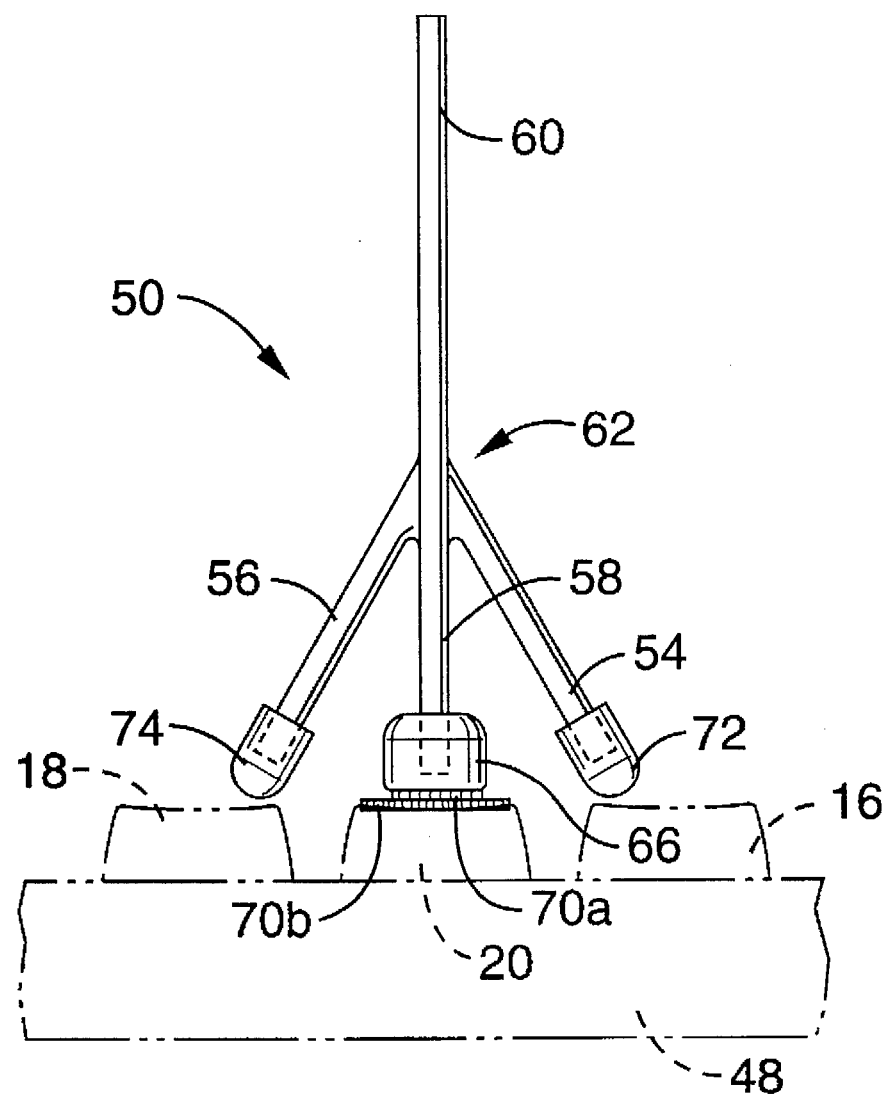
FIG. 7 is a rear view of the joystick converter apparatus shown in FIG. 5.
Figure 8:
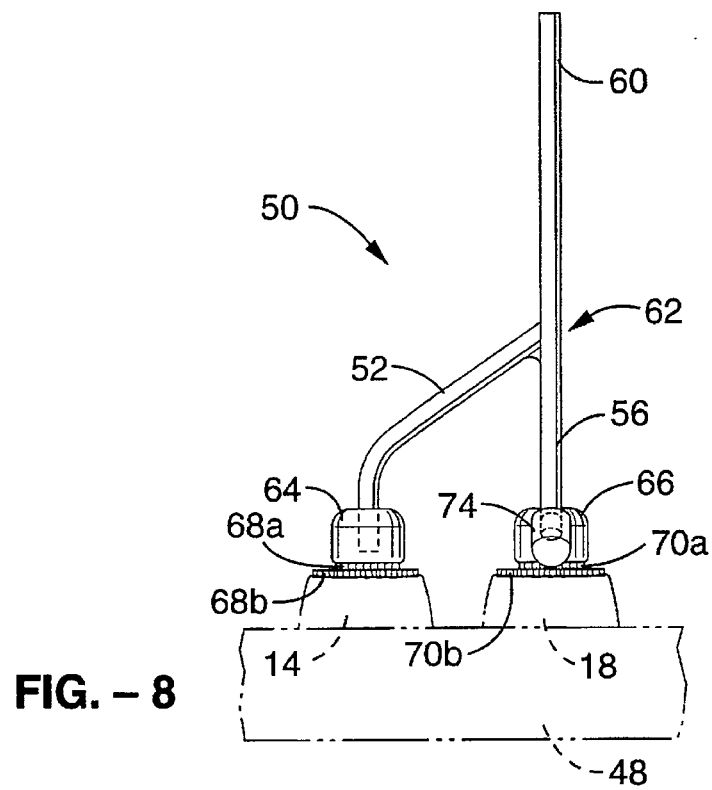
FIG 8 is a side view of the joystick converter apparatus and arrow key array shown in FIG. 5.

Referring next to FIG. 5 through FIG. 9 a second embodiment 50 of a joystick converter apparatus in accordance with the invention is shown. In this embodiment, the first, second, third and fourth actuating means comprise a plurality of actuators or actuator branches, preferably in the form of first, second, third, and fourth branches or legs 52, 54, 56, 58 respectively, which are coupled to a control rod 60 at, its lower end 62. Control rod 60 and branches 52, 54, 56, 58 are preferably fabricated from plastic or engineering resin or composite materials thereof. Preferably, control rod 60 and branches 52 through 58 are integral portions of a single molded piece. Joystick converter apparatus 50 is structured and configured such that first branch 52 corresponds to UP arrow key 14, second branch 54 corresponds to RIGHT arrow key 16, third branch 56 corresponds to LEFT arrow key 18, and fourth branch 58 corresponds to DOWN arrow key 20. Thus, when the second embodiment 50 is mounted on arrow key array 12, first branch 52 is positioned adjacent UP arrow key 14, second branch 54 is positioned adjacent RIGHT arrow key 16, third branch 56 is positioned adjacent LEFT arrow key 18, and fourth branch 58 is positioned adjacent DOWN arrow key 20. Fourth branch 58 is generally co-linear with control rod 60, and second, third and fourth branches 54, 56, 58 are arranged in a substantially co-planar relationship. Referring particularly to FIG. 7, second and third branches 54, 56 preferably are slightly shorter than first and fourth branches 52, 58, so that second and third branches 54, 56 are slightly spaced above LEFT arrow key and RIGHT arrow key 16, 18, respectively when the device is attached to arrow key array 12.

As with the first embodiment of the invention, means for coupling two of the four actuating means to two of the four arrow keys in array 12 are provided. The coupling means includes pads 64, 66 coupled to first and fourth branches 52, 58 respectively. The coupling means also includes fasteners 68a, 70a of VELCRO® or like material mounted on the bottom of pads 64, 66 respectively, and corresponding mating fasteners 68b, 70b, mounted on UP and DOWN arrow keys 14, 20 respectively. By engaging fasteners 68a, 70a on pads 64, 66 to the corresponding mating fasteners 68b, 70b on UP and DOWN arrow keys 14, 20, first and fourth branches 52, 58 are effectively coupled to UP and DOWN arrow keys 14, 20 respectively. Pads 64, 66 are preferably made of an elastomeric or resilient material such as a natural or synthetic rubber, and are held onto first and fourth branches by friction, adhesives, snap-fitting, or like means.

Figure 9:
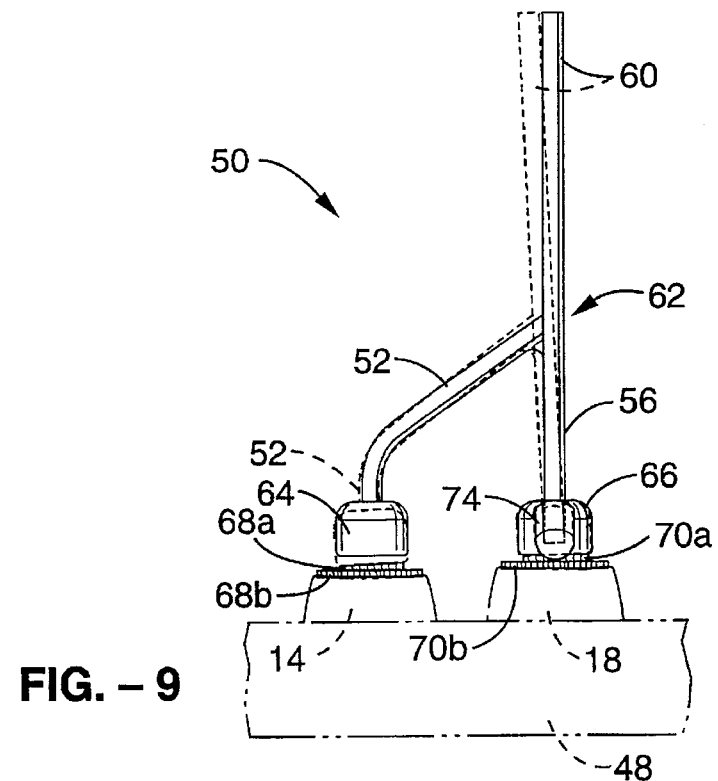
FIG. 9 is a side view of the joystick converter apparatus shown in FIG. 5, showing actuation of a DOWN arrow key.

Means for preventing scratching of the arrow key surfaces are preferably included with second and third branches 54, 56, and preferably comprise rubber tips 72, 74, which are held onto second and third branches 54, 56 respectively by friction, adhesives, or like means. Like pads 64, 66, tips 72, 74 are preferably made of natural or synthetic rubber or other elastomeric material. The second embodiment 50 differs from the first embodiment 10 primarily in that the first, second, third, and fourth actuating means are slightly extended in length and are structured and configured to form narrow, elongated branches rather than wide flattened branches provided in the first embodiment 10 described above. Otherwise, the first and second embodiments of the invention operate in generally the same manner, with tilting, rocking, or otherwise directionally moving control rod 60 providing selective cursor movement or directional control. By moving or tilting control rod 60 forward, first branch 52 actuates UP arrow key 14, and when control rod 60 is tilted or moved to the right, second branch 54 depresses and actuates RIGHT arrow key 16. Movement of control rod 60 to the left causes third branch 56 to actuate LEFT arrow key 18, and moving control rod 60 back towards the user causes fourth branch 58 to actuate DOWN arrow key 20. As with the first embodiment apparatus 10, moving control rod 60 back may cause second and third branches 54, 56 to come into slight contact with RIGHT and LEFT arrow keys 16, 18 respectively, but without actuating these arrow keys. FIG. 9 illustrates movement of control rod 60 forward for actuation of Up arrow key 14.

The joystick converter apparatus 50 may be structured and configured for use with arrow key arrays in a standard cross-shaped configuration by simply extending fourth branch 58 out from control rod 60 in the same manner as first branch 52, so that first, second, third, and fourth branches 52 through 58 are arranged in a cross-shaped arrangement corresponding to the standard cross-shaped arrow key array. Such an arrangement would operate in a fashion identical to that described above for the apparatus 50.

Accordingly, it will be seen that the present invention provides a joystick converter apparatus which allows quick and accurate cursor movement and directional control by direct actuation of keyboard arrow keys. Although the description above contains many specificities, these should not be construed as limiting the scope of the invention but as merely providing illustrations of some of the presently preferred embodiments of this invention. Thus, the scope of the invention should be determined by the appended claims and their legal equivalents.

I claim:

1. For use with a computer keyboard arrow key array having an UP arrow key, a LEFT arrow key, a DOWN arrow key and a RIGHT arrow key, a joystick converter apparatus comprising:
    (a) a control rod;
    (b) first, second, third, and fourth actuating means for depressing said arrow keys, said actuating means operatively coupled to said control rod;
    (c) means for detachably coupling at least one of said actuating means to a corresponding arrow key; and
    (d) a substantially flat T-shaped plate, said plate coupled to said control rod, said first actuating means comprising a first branch on said plate, said second actuating means comprising a second branch on said plate, said third actuating means comprising a third branch on said plate, said fourth actuating means comprising a junction region on said plate, said junction region located between said first, second and third branches.

2. An apparatus as recited in claim 1, wherein said first branch of said T-shaped plate is structured and configured for positioning adjacent said UP arrow key, said second branch is structured and configured for positioning adjacent said RIGHT arrow key, said third branch is structured and configured for positioning adjacent said LEFT arrow key, and said junction region is structured and configured for positioning adjacent said DOWN arrow key.

3. An apparatus as recited in claim 2, wherein said detachable coupling means is associated with said first branch and said junction region, said detachable coupling means is structured and configured to reversibly attach said first branch to said UP arrow key by said coupling means, and said detachable coupling means structured and configured to reversibly attach said junction region to said DOWN arrow key.

4. An apparatus as recited in claim 2, wherein said second actuating means further comprises a downwardly disposed protuberance on a lower surface of said second branch, said third actuating means further comprises a downwardly disposed protuberance on a lower surface of said third branch, said protuberance on said second branch is structured and configured to be positioned above and spaced apart from said RIGHT arrow key, and said protuberance on said third branch is structured and configured to be positioned above and spaced apart from said LEFT arrow key.

5. An apparatus as recited in claim 3, wherein said coupling means comprises a fastening hook and pile fabric fastener arrangement associated with a lower surface of said first branch and a lower surface of said junction region.

6. For use with a computer keyboard arrow key array with an UP arrow key, a LEFT arrow key, a DOWN arrow key and a RIGHT arrow key arranged in an inverted T-shaped layout, a joystick converter apparatus comprising:
    (a) a control rod;
    (b) a substantially flat T-shaped plate, said plate reversibly coupled to said control rod, said plate including a first branch, a second branch, and a third branch, said plate including a junction region, said junction region located between said first, second and third branches;
    (c) means for detachably coupling said first branch to said UP arrow key; and
    (d) means for detachably coupling said junction region to said DOWN arrow key.

7. An apparatus as recited in claim 6, wherein said first branch of said T-shaped plate is structured and configured for positioning adjacent said UP arrow key, said second branch is structured and configured for positioning adjacent said RIGHT arrow key, said third branch is structured and configured for positioning adjacent said LEFT arrow key, and said junction region is structured and configured for positioning adjacent said DOWN arrow key.

8. An apparatus as recited in claim 7, further comprising:
    (a) a first downwardly disposed protuberance on a lower surface of said second branch, said first protuberance structured and configured to be positioned adjacent and spaced apart from said RIGHT arrow key; and
    (b) a second downwardly disposed protuberance on a lower surface of said third branch, said second protuberance structured and configured to be positioned adjacent and spaced apart from said LEFT arrow key.

9. An apparatus as recited in claim 6, wherein said detachable coupling means comprise fastening hook and pile fabric fasteners associated with said first branch and said junction region.

* * * * *